United States Patent

Hajjar

(10) Patent No.: US 9,377,673 B2
(45) Date of Patent: Jun. 28, 2016

(54) CLOSED LOOP VERIFICATION OF RENDERED CONTENT

(75) Inventor: Roger A. Hajjar, San Jose, CA (US)

(73) Assignee: PRYSM, INC., San Jose, CA (US)

( * ) Notice: Subject to any disclaimer, the term of this patent is extended or adjusted under 35 U.S.C. 154(b) by 729 days.

(21) Appl. No.: 13/554,979

(22) Filed: Jul. 20, 2012

(65) Prior Publication Data

US 2014/0022235 A1  Jan. 23, 2014

(51) Int. Cl.
| | | |
|---|---|---|
| *G01S 17/89* | (2006.01) |
| *G03B 21/00* | (2006.01) |
| *G09F 19/18* | (2006.01) |
| *H04N 9/31* | (2006.01) |
| *H04N 21/24* | (2011.01) |
| *H04N 21/414* | (2011.01) |
| *H04N 21/44* | (2011.01) |
| *H04N 21/442* | (2011.01) |
| *H04N 21/4425* | (2011.01) |
| *H04N 21/658* | (2011.01) |
| *H04N 21/81* | (2011.01) |

(Continued)

(52) U.S. Cl.
CPC ............. *G03B 21/00* (2013.01); *G03B 21/005* (2013.01); *G09F 19/18* (2013.01); *H04N 9/3129* (2013.01); *H04N 9/3194* (2013.01); *H04N 21/2407* (2013.01); *H04N 21/41415* (2013.01); *H04N 21/44008* (2013.01); *H04N 21/4425* (2013.01); *H04N 21/44204* (2013.01); *H04N 21/6582* (2013.01); *H04N 21/812* (2013.01); *H04N 21/8352* (2013.01); *G03B 21/62* (2013.01)

(58) Field of Classification Search
CPC .. G09G 2320/027; G09G 3/045; G01S 17/89; B61L 5/845

USPC .............. 345/690, 418, 32; 356/5.04; 340/815.41, 815.54

See application file for complete search history.

(56) References Cited

U.S. PATENT DOCUMENTS

| | | | | |
|---|---|---|---|---|
| 5,690,421 | A * | 11/1997 | Shea et al. ................... 362/293 |
| 6,294,918 | B1 * | 9/2001 | Hung ....................... 324/750.14 |
| 6,412,956 | B2 * | 7/2002 | Fujita et al. .................. 353/122 |

(Continued)

FOREIGN PATENT DOCUMENTS

| | | |
|---|---|---|
| CN | 1536871 A | 10/2004 |
| CN | 1871846 A | 11/2006 |

(Continued)

OTHER PUBLICATIONS

Chinese Office Action (with attached English translation) for Application No. 201310305519.6 dated Feb. 2, 2015; 30 total pages (Continued)

*Primary Examiner* — Ricardo L Osorio
(74) *Attorney, Agent, or Firm* — Patterson & Sheridan, LLP

(57) ABSTRACT

An electronic display device provides closed-loop verification that specific content has been displayed by the display device. When desired digital image content is rendered as an image or video by the electronic display device, a confirmation signal is generated by one or more components of the display device to verify that the image content has been successfully displayed. The confirmation signal may include performance measurements of the one or more components of the display device and/or a signature output that is associated with a signature code embedded in the image content. The signature output uniquely identifies the digital image content.

21 Claims, 11 Drawing Sheets

(51) Int. Cl.
*H04N 21/8352* (2011.01)
*G03B 21/62* (2014.01)

(56) References Cited

U.S. PATENT DOCUMENTS

| | | | |
|---|---|---|---|
| 6,502,045 B1 * | 12/2002 | Biagiotti | 702/66 |
| 6,695,451 B1 * | 2/2004 | Yamasaki et al. | 353/30 |
| 2001/0033678 A1 * | 10/2001 | Hirai | 382/128 |
| 2004/0264734 A1 | 12/2004 | Wakao | |
| 2007/0058835 A1 | 3/2007 | Schrijen et al. | |
| 2007/0195209 A1 * | 8/2007 | Cheng | 348/745 |
| 2009/0001272 A1 | 1/2009 | Hajjar | |
| 2011/0001881 A1 * | 1/2011 | Kawahara | 348/649 |
| 2011/0298695 A1 | 12/2011 | Hajjar et al. | |

FOREIGN PATENT DOCUMENTS

| | | |
|---|---|---|
| CN | 101689341 A | 3/2010 |
| CN | 102289072 A | 12/2011 |
| JP | 2010193273 A * | 9/2010 |

OTHER PUBLICATIONS

Chinese Office Action (with attached English translation) for Application No. 201310305519.6 dated Oct. 28, 2015; 32 total pages.

* cited by examiner

CLOSED LOOP VERIFICATION OF RENDERED CONTENT

BACKGROUND OF THE INVENTION

1. Field of the Invention

Embodiments of the present invention relate generally to display devices and, more specifically, to closed loop verification of rendered content in display devices.

2. Description of the Related Art

Digital signage generally uses one or more electronic display screens to display video programming, menus, advertising, or other information, and is commonly used in various public and private venues. For example, digital signs are frequently utilized in retail stores, airports, hotels, restaurants, and corporate buildings. The inherent flexibility and convenience of digital signs makes them ideal for displaying advertisements; digital signs can deliver targeted messages to specific locations at specific times, and can be easily and remotely reprogrammed when desired.

Unlike passive media, such as conventional billboards, publications, and the like, digital signs are active display devices, and any malfunction of a digital sign can result in a failure to display desired content in a viewable form. Such malfunctions include power loss, physical damage to the display screen, and display errors due to long-term wear-and-tear of the display device, among others. However, even for a small number of digital signs, actively viewing each digital sign and/or spot-checking the performance of each digital sign is an impractical approach for verifying that desired content has been displayed. Consequently, the ability of an advertiser to verify that desired content is displayed for a predetermined time period and at a specified time by a particular display screen without actually viewing or spot-checking the performance of the display screen is highly desirable.

Accordingly, there is a need in the art for systems and methods of reliably verifying that desired content has been displayed by an electronic display device.

SUMMARY OF THE INVENTION

Embodiments of the present invention set forth systems and methods for closed-loop verification that specific content has been displayed by an electronic display device. When desired digital image content is rendered as an image or video by the electronic display device, a confirmation signal is generated by one or more components of the display device to verify that the content has been successfully displayed. The confirmation signal may include performance measurements of the one or more components of the display device, thereby indicating whether or not said components are operating within a desired specification while the digital image content is rendered as an image or video. In some embodiments, the confirmation signal may further include a signature output that is associated with a signature code embedded in the digital image content. The purpose of the signature output is to uniquely identify specific digital image content. The signature output is generated when specific digital image content is rendered as an image, thereby providing verification that the particular content is displayed by the electronic display device at a targeted time and for a specified time duration. One advantage of the disclosed embodiments is that an imaging system can provide closed-loop verification that specific content has been displayed by the imaging system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
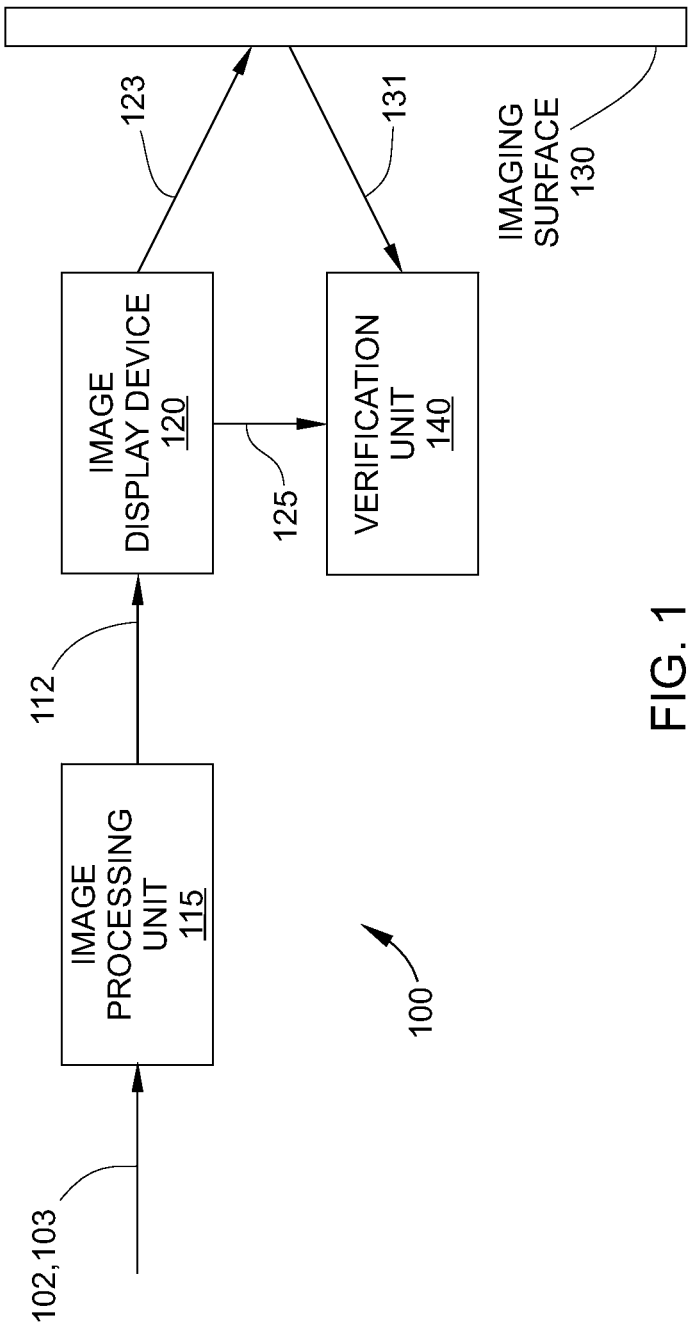
FIG. 1 is a schematic side view of a portable display device, according to an embodiment of the invention.

FIG. 1 is a schematic diagram of an imaging system 100 configured to provide closed-loop verification that display content provided to imaging system 100 has been rendered, according to embodiments of the invention. The term "rendering," as used herein, is defined as the process of generating a displayed digital image or images from an image data signal, such as a video signal. Generally, rendering comprises generating pixel-based data from the video signal as well as displaying the digital image on a display surface based on the pixel-based data. As shown, imaging system 100 includes an image processing unit 115, an image display device 120, an imaging surface 130, and a verification unit 140.

Image processing unit 115 receives digital image content 102, for example from a computer or information network or from some other data routing device, and converts said input into image data signals 112. Digital image content 102 includes images and/or videos that are in a digitized format for transmission to imaging system 100. In some embodiments, digital image content 102 further includes digitized audio content that may accompany the image and/or video contained therein. Furthermore, in some embodiments, a signature code 103 is embedded in digital image content 102.

Signature code 103 can be used to generate a signature output 131 when digital image content 102 is rendered as an image or video on imaging surface 130. Signature code 103 is configured so that signature output 131 uniquely identifies digital image content 102 and can therefore be used to verify that digital image content 102 has been successfully rendered as an image or video on imaging surface 130. Various embodiments of signature code 103 are described in greater detail below in conjunction with FIG. 2.

Image data signals 112 provide image data to image display device 120 for each image or video frame included in digital image content 102. Image data signals 112 are in a format that can be interpreted by image display device 120 to control elements of imaging system 100 to render digital image content 102 into an image or video displayed on imaging surface 130.

Image display device 120 renders digital image content 102 on imaging surface 130 to create a visible image or video using image data signals 112. For example, image display device 120 may direct a light beam 123 to imaging surface 130 to render digital image content 102 as an image or video on imaging surface 130. In another example, image display device 120 may direct a light image onto imaging surface 130. In addition, image display device 120 provides a confirmation signal 125 to verification unit 140 when the image or video is rendered on imaging surface 130. Confirmation signal 125 includes performance measurements of one or more components of image display device 120, thereby indicating whether or not said components are operating within a desired specification while the digital image content is rendered as an image or video. In this way, confirmation signal 125 indicates whether or not digital image content 102 has been successfully rendered as an image or video in a manner visible to a viewer.

Imaging surface 130 may be an image-generating imaging surface, such as a display screen, that displays images rendered from digital image content 102. In some embodiments, imaging surface 130 is configured as an integral component of imaging system 100. Alternatively, imaging surface 130 may be associated with multiple imaging systems 100, which together are used to render images on imaging surface 130. In such embodiments, each of the multiple imaging systems 100 is configured to render a portion of a desired image on a corresponding portion of imaging surface 130. Imaging surface 130 may constitute the display surface of any technically feasible display device or system type, including but not limited to the display surface of a light-emitting diode (LED) display, a digital light projection (DLP) display, a liquid crystal display (LCD) and a laser-phosphor display (LPD).

Verification unit 140 receives confirmation signal 125 and confirmation signal 131, and then determines whether or not digital image content 102 is rendered successfully on imaging surface 130. Confirmation signal 131 is generated when digital image content 102 is rendered on imaging surface 130 by image display device 120. In some embodiments, confirmation signal 131 corresponds to the visible image rendered on imaging surface 130. In other embodiments, confirmation signal 131 may originate from digital image content 102, such as distinct portions of digital image content 102 that, when rendered on imaging surface 130, correspond to a portion or region of imaging surface 130 that is not visible to a viewer. Because confirmation signal 131 is generated when digital image content 102 is rendered on imaging surface 130, receipt of a proper confirmation signal 131 provides closed-loop verification that digital image content 102 has been successfully rendered on imaging surface 130. In addition, confirmation signal 131 may include a timestamp, so that the time or time window of digital image content 102 rendered on imaging surface 130 may be a contributor to confirmation signal 130. Consequently, embodiments of the invention obviate the need to perform an external audit or verification procedure on imaging system 100 using an observer, external camera, and the like to confirm that digital image content 102 has been successfully rendered on imaging surface 130. In some embodiments, verification unit 140 is located remotely from image display device 120 and imaging surface 130, and may receive confirmation signals 125 and 131 (or suitable portions thereof) via a network connection. In other embodiments, verification unit 140 is configured as a component of image display device 120, and determines whether or not digital image content 102 is rendered successfully on imaging surface 130 locally.

Figure 2:
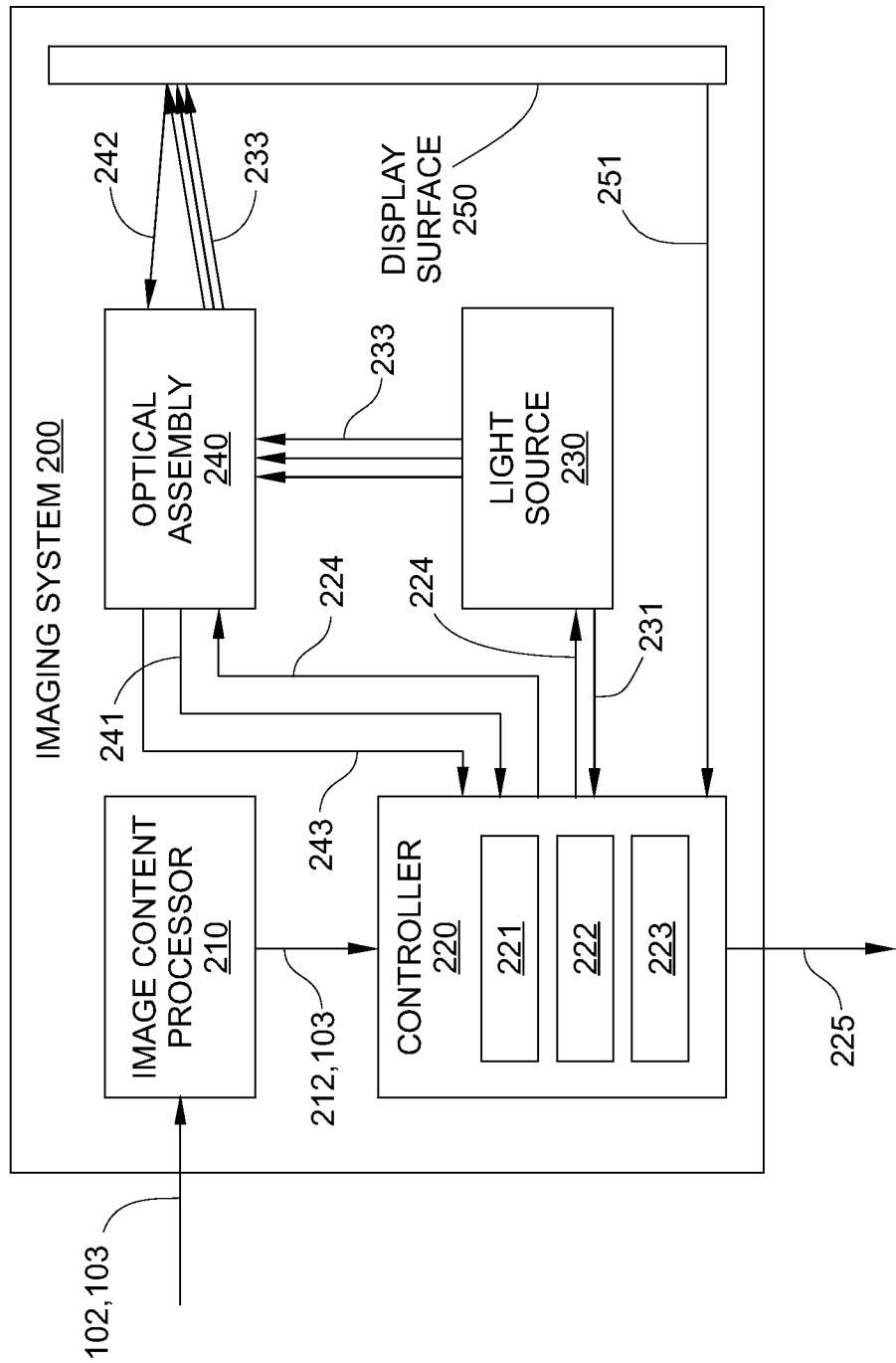
FIG. 2 is a schematic diagram of a light-projecting imaging system configured according to embodiments of the invention.

FIG. 2 is a schematic diagram of a light-projecting imaging system 200 configured according to embodiments of the invention. Light-projecting imaging system 200 provides closed-loop verification that display content provided to light-projecting imaging system 200 has been rendered. Light-projecting imaging system 200 may be any technically feasible light-based electronic display device, such as a laser-phosphor display (LPD), a light-emitting diode (LED) digital light processing (DLP) display, an LED-liquid crystal display (LCD) device, and the like.

In some embodiments, light-projecting imaging system 200 may be one tile of a multi-tile display system, and may be configured to operate in conjunction with other display tiles to produce a single coherent image for a viewer. For ease of description, in the embodiment illustrated in FIG. 2, light-projecting imaging system 200 is configured as a stand-alone electronic display device, and is not part of a multi-tile display system. As such, light-projecting imaging system 200 includes an image content processor 210, a controller 220, a light source 230, an optical assembly 240, and an display surface 250. In embodiments in which light-projecting imaging system 200 is configured as one tile of a multi-tile display system, one or more of the elements of imaging system listed above may be shared by multiple tiles of the multi-tile display system.

Image content processor 210 is configured to receive digital image content 102, described above, and converts said input into image data signals 212. For example, image content processor 210 may receive digital image content 102 from a computer or information network or from some other data routing device. In some embodiments, digital image data content 102 may be stored locally, and image content processor 210 receives digital image data content 102 from a local digital storage apparatus such as a hard disk drive. As described above in conjunction with FIG. 1, signature code 103 may be embedded in digital image content 102, and can be used to generate a signature output 243 (described below) that uniquely identifies digital image content 102 and therefore can be used to verify that desired digital image content 102 has been successfully rendered on display surface 250. Various embodiments of signature code 103 are described in greater detail below. As shown, image content processor 210 transmits image data signals 212, which may include signature code 103, to controller 220.

Image data signals 212 provide image data to controller 220 for each image or video frame included in digital image content 102. Image data signals 212 are in a format that can be interpreted by controller 220 to control elements of imaging system 200 to render digital image content 102 into an image or video displayed on display surface 250. For example, for a given frame of image or video content, image data signals 212 may include desired intensity levels for each primary color associated with a pixel of display surface 250. Using image data signals 212, controller 220 can then control light source 230 and optical assembly 240 to generate the desired color and intensity at each pixel of display surface 250.

Controller 220 is configured to render an image associated with digital image content 102 on display surface 250 by controlling light source 230 and optical assembly 240 using image data signals 212. Controller 220 may include a processor unit 221, a memory unit 222, and one or more input/output (I/O) ports 223. Processor 221 unit includes any technically feasible digital processing device, such as a micro-processor. Memory unit 222 may include any type of memory or data storage device, such as volatile memory (such as RAM), non-volatile memory (such as ROM, flash memory, etc.), data storage, such as a hard disk drive and/or flash memory, or any combination thereof. I/O ports 223 provide an interface between controller 220 and image content processor 210, light source 230, optical assembly 240, and display surface 250, as well as entities external to light-projecting imaging system 200. In some embodiments, controller 220 may be configured as a dedicated controller for light-projecting imaging system 200, and in other embodiments controller 220 may be configured to render an image on one or more display surfaces 250 by controlling multiple light sources 230 and optical assemblies 240.

Controller 220 is also configured to receive one or more inputs that enable verification that digital image content 102 is successfully rendered as a desired image or video on display surface 250. Specifically, controller 220 may receive a confirmation signal 231 from light source 230, a confirmation signal 241 and/or a signature output 243 from optical assembly 140, and/or a confirmation signal 251 from display surface 250. Controller 220 then transmits a confirmation signal 225 to a database, a computing device, or other external entity that performs a verification process and/or stores data contained in confirmation signal 225 for a remote verification process to be performed subsequently. Confirmation signal 225 includes some or all of the data included in confirmation signal 231, confirmation signal 241, signature output 243, and confirmation signal 251. Thus, confirmation signal 225 includes confirmation data based on rendered digital image content 102 indicating that one or more elements within light-projecting imaging system 200 that contribute to the generation of rendered digital image content 102 were operating properly while rendering the digital image content. Confirmation signal 231, confirmation signal 241, signature output 243, and confirmation signal 251 are described in greater detail below.

Light source 230 may include any technically feasible light source suitable for rendering digital image content 102 in a visible manner on display surface 250, and is configured to generate one or multiple light beams 233. For example, light source 230 may include lasers, light-emitting diodes (LEDs), halogen lamps, and the like. Light beams 233 may include optical pulses that carry image information, or light having a substantially constant intensity that is modulated by optical assembly 140. In some embodiments, light beams 233 include visible lasers beams of different colors that discretely illuminate individual pixel elements of display surface 250 to produce an image. In other embodiments, light beams 233 include excitation laser beams, such as near-violet or ultra-violet (UV) laser beams, that act as excitation beams to excite phosphors on display surface 250.

Optical assembly 240 is configured to direct light beams 233 to display surface 250 to produce a high-resolution still or video image on display surface 250 for a viewer. Optical assembly 240 may include any technically feasible configuration of optical elements for directing light beams 233 as desired to produce an image on display surface 250. For example, when imaging system 200 is configured as a laser-phosphor display (LPD), optical assembly 240 may include various mirrors and lenses for focusing and directing light beams 233 and a rotating polygon mirror for scanning light beams 233 across display surface 250. In another example, when imaging system 200 is configured as a digital light processing (DLP) display, optical assembly 240 may include a prism or light wheel for separating light beams 233 into three or more primary colors and micro-electro-mechanical (MEMS) mirror arrays that reflect a desired intensity of color to display surface 250 for each pixel of the generated image. Similarly, other configurations of optical assembly 240 also fall within the scope of the present invention.

Display surface 250 may be any technically feasible imaging surface, such as a display screen, that displays images rendered from digital image content 102 in a visible manner for a viewer. In some embodiments, display surface 250 is configured as an integral component of imaging system 200. Alternatively, display surface 250 may be associated with multiple imaging systems 200, which together are used to render as a visible image complete images on imaging surface 250. In such embodiments, each of the multiple imaging systems 200 is configured to render as a visible image a portion of a desired image on a corresponding portion of imaging surface 250.

In operation, imaging system 200 receives digital image content 102 and image content processor 210 converts said input into image data signals 212. In some embodiments, digital image content 102 may also include signature code 103. Controller 212 uses image data signals 212 to control light source 230 and optical assembly 240 and render as a visible image an image associated with digital image content 102 on display surface 250. As such an image is generated, controller 220 receives confirmation that the desired image is successfully rendered on display surface 250 by receiving one or more closed-loop verification signals from one or more components of imaging system 200, i.e., confirmation signal 231, confirmation signal 241, signature output 243, and/or confirmation signal 251.

Confirmation signal 231 includes outputs from light source 230 indicating light source 230 is operating as specified during the time period that digital image content 102 is imaged on display surface 250. In some embodiments, confirmation signal 231 includes a "go/no-go" signal regarding one or more performance measurements associated with the operation of light source 230, where a go indicates proper operation and a no-go indicates that light source 230 is not operating within predetermined parameters. Such parameters may include one or more of light source brightness, a light source current draw, and/or any other measurable property of light source that can indicate that light source 230 is enabled. In other embodiments, confirmation signal 231 includes one or more of the actual performance measurements associated with light source 230, so that the determination of the proper operation of light source 230 can be made by controller 220 or by an entity external to imaging system 200. Thus, in such embodiments, confirmation signal 231 includes data indicating that light source 230 was operating properly while rendering digital image content 102, and is not simply a binary status indicator. Consequently, it is known that light source 230 was not only "on," but that light source 230 contributed to the generation of rendered digital image content 102 in a specified manner to form a desired image on display surface 250.

Confirmation signal 241 includes outputs from optical assembly 240 indicating optical assembly 240 is operating as specified during the time period that digital image content 102 is imaged on display surface 250. In some embodiments, confirmation signal 241 includes one or more performance measurements associated with optical assembly 240, and in other embodiments confirmation signal includes a go/no-go signal regarding these performance measurements. Such performance measurements may be based on measurements performed within optical assembly 140, such as the direct measurement of light source intensity and calibration using a photodetector. All or a portion of light beams 233 may be measured with such a photodetector. Alternatively, such performance measurements may be based on an optical feedback signal 242 that is generated by directing one or more of light beams 233 to display surface 250 and rendering digital image content 102 in a visible manner for a viewer. For example, when imaging system is configured as a LPD, optical feedback signal 242 may be generated when one or more light beams 233 are scanned across calibration features disposed on the non-viewable side of display surface 250. In another example, optical feedback signal 242 may be generated when a servo beam is scanned across calibration features disposed on the non-viewable side of display surface 250. Thus, optical feedback signal 242 can serve multiple purposes. First, optical feedback signal 242 allows controller 220 to fine tune the timing and positioning of light beams 233 by controlling light source 230 and optical assembly 240. Second, optical feedback signal 242 can be used to confirm that digital image content 102 is positioned on display surface 250 and that light source 230 is controlled correctly to successfully render digital image content 102 in a viewable manner for a viewer. Third, optical feedback signal 242 can be used to detect if regions of display surface 250 is broken. Thus, confirmation signal 241 includes data indicating that optical assembly 240 was operating properly while rendering digital image content 102, and is not simply a binary status indicator. Consequently, it is known that optical assembly 240 was not only working, but that optical assembly 240 functioned in a specified manner to contribute to the generation of a desired image on display surface 250. Various embodiments of optical feedback signal 242 are described below in conjunction with FIGS. 7-11.

Confirmation signal 251 includes one or more outputs from display surface 250 indicating the proper or improper operation thereof. In one embodiment, confirmation signal 251 includes a "screen break" signal, that indicates if a portion of display surface 250 is damaged and approximately what fraction of the viewable surface of display surface 250 is not functional. In another embodiment, the feedback component from optical feedback signal 242 may contain a signal indicating a screen break.

Signature output 243 is generated when digital image content 102 containing signature code 103 is successfully rendered as a visible image on display surface 250. Because signature output 243 is generated only when digital image content 102 containing signature code 103 is successfully rendered, signature output 243 can uniquely identify digital image content 102. Thus, while receipt of confirmation signal 231, confirmation signal 241, and confirmation signal 251 indicates that imaging system 200 is operating correctly when digital image content 102 is rendered as an image or video on display surface 250, receipt of signature output 243 indicates that the image or video being generated is the particular digital image content 102 that is desired.

Signature output 243 can have various embodiments, and may include a combination of two of more of the various embodiments described herein. In some embodiments, signature output 243 may include a numerical value derived from one or more attributes of a predetermined frame in the digital image content. For example, signature output 243 may include a numerical value derived from one or more attributes of one or more predetermined frame numbers of digital image content 102. In another example, signature output 243 may include a numerical value that is generated when one or more of light beams 233 or servo beams generated by light source 230 are directed to a detector and pulsed in a sequence included in signature code 103. In such an embodiment, signature output 103 may be associated with a non-viewable portion of a frame in digital image content 102 and consequently the pulsed light source is directed to a detector located in a non-viewable portion of display surface 250. Such numerical values are only generated when digital image content 102 that includes signature code 103 is rendered as an image by imaging system 200. Thus, the generation of a correct value for signature output 243 indicates that desired image content 102 is being displayed.

In some embodiments, signature code 103 and signature output 243 are configured so that a period of time can be determined during which digital image content 102 is imaged in a visible manner on display surface 250. For example, a time stamp may be associated with signature output 243 when received by controller 220. Furthermore, signature code 103 and signature output 243 may be associated with one or more predetermined frames of digital image content 102, such as the first and last frames, or with each and every frame of digital image content 102.

After controller 220 receives confirmation signal 231, confirmation signal 241, signature output 243, and confirmation signal 251, a verification process is performed. In some embodiments, the verification process is performed by imaging system 200, for example by controller 220. In other embodiments, the verification process is performed by an entity external to imaging system 200, such as a business that has paid for specific content to be displayed by imaging system 200 at a specific time. In such embodiments, controller 220 typically transmits confirmation signal 225 to a database, a computing device, or other external entity to facilitate the verification process and/or stores data contained in confirmation signal 225 for a subsequently performed verification process.

In the verification process, proper performance of imaging system 200 is monitored and, in some embodiments, display of desired digital image content 102 is also confirmed. Proper performance of imaging system 200 is monitored via confirmation signal 231, confirmation signal 241, and confirmation signal 251. Specifically, performance measurements included in confirmation signal 231, confirmation signal 241, and confirmation signal 251 can be compared to predetermined values for the various components of imaging system 200 to verify proper operation thereof. For example, in one embodiment, a screen break value included in confirmation signal 251 must be less than a predetermined portion of display surface 250. Otherwise, too large a portion of display surface 250 is damaged and display of the desired content is not considered verified. Other examples of performance measurements that can be used as part of the verification process include light source brightness, alignment of displayed image on display surface 250, light source pulse-width, light source pulse amplitude, and the like. For different configurations of imaging system 200, confirmation signals 231, 241, and 251 may include different performance measurements without exceeding the scope of the invention.

In some embodiments, as part of the verification process, confirmation that desired content is successfully displayed by imaging system 200 is achieved via signature output 243. For example, the verification process may include comparing signature output 243 to a predetermined value for digital image content 102 at a predetermined time and for a predetermined time period. Thus, unless signature output 243 matches the unique value associated with specific digital image content 102, display of said image content is not verified.

Figure 3:
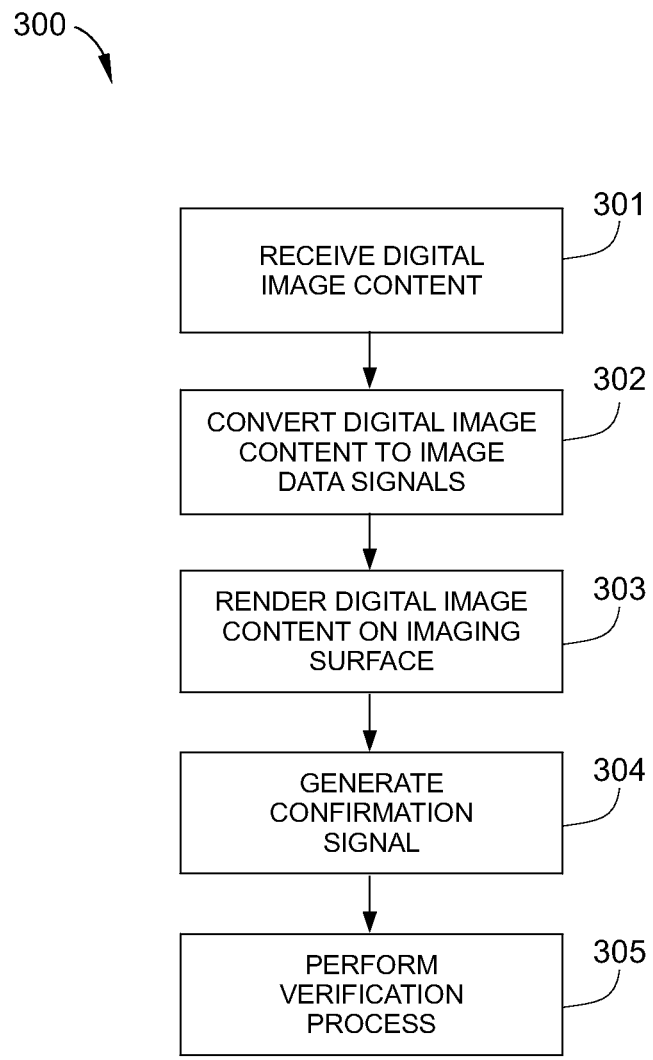
FIG. 3 sets forth a flowchart of method steps for rendering digital image content in a visible manner, according to embodiments of the invention.

FIG. 3 sets forth a flowchart of method steps for rendering digital image content in a visible manner, according to embodiments of the invention. Although the method steps are described with respect to imaging system 100 of FIG. 1 and imaging system 200 of FIG. 2, persons skilled in the art will understand that performing the method steps to verify the display of desired image content with any imaging system is within the scope of the invention.

As shown, method 300 begins at step 301, where digital image content 102 is received. In some embodiments, signature code 103 is embedded in digital image content 102.

In step 302, digital image content 102 is converted to image data signals, such as image data signals 112 in FIG. 1 or image data signals 212 in FIG. 2.

In step 303, digital image content 102 is rendered in a visible manner on imaging surface, such as imaging surface 130 in FIG. 1 or display surface 250 in FIG. 2.

In step 304, a confirmation signal is generated while digital image content 102 is rendered on the imaging surface. In some embodiments, the confirmation signal includes one or more of confirmation signal 231, confirmation signal 241, signature output 243, and confirmation signal 251 of FIG. 2. In some embodiments, the confirmation signal generated in step 304 comprises signals used in the normal operation of light-projecting imaging system 200, such as servo feedback signals, light source calibration singles, and the like. In other embodiments, the confirmation signal may include one or more go/no-go signals indicating that light-projecting imaging system 200 is operating correctly, such as a go/no-go signal for each of light source 230, optical assembly 240, display surface 250.

In step 305, in response to receipt of the confirmation signal generated in step 304, a verification process is performed to confirm that digital image content 102 has been successfully imaged in a visible manner on the imaging surface. As noted above, such a verification process may be performed by the imaging system and/or remotely by an entity external to the imaging system. The verification process may be based on signature output 243, confirmation signals 231, 241, 251, or a combination thereof.

Figure 4:
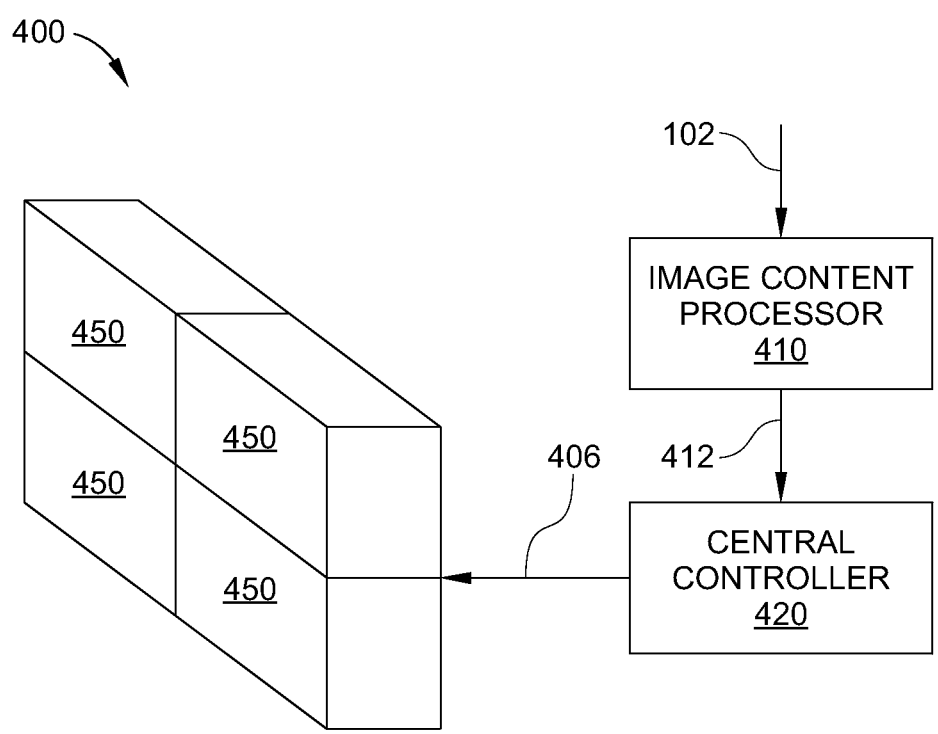
FIG. 4 illustrates one example of a 2×2 tiled display device that may benefit from embodiments of the invention.

Tiled display walls provide a large-format environment for presenting high-resolution visualizations by coupling together the output from multiple projectors. Such large displays may be created by tiling a plurality of smaller display devices together. For example, the video walls frequently seen in the electronic media typically use multiple electronic display devices, such as imaging system 200 in FIG. 2, which are tiled to create such large displays. In some embodiments of the invention, digital image content is rendered as a visible image on a tiled display wall in a verifiable manner. FIG. 4 illustrates one example of a 2×2 tiled display device 400 that may benefit from embodiments of the invention.

Tiled display device 400 includes a plurality of electronic display devices 450 mounted to a display frame (not shown for clarity). In the example illustrated in FIG. 4, four electronic display devices 450 are mounted together in a 2×2 array. Other configurations of multiple electronic display devices, e.g., 1×4, 2×3, 5×6, etc., also fall within the scope of the present invention. Each of electronic display devices 450 is substantially similar in organization and operation to imaging system 200 in FIG. 2, except that the electronic display devices 450 of tiled display device 400 are configured to operate in combination with each other to display a single large format image or video sequence, rather than four independent images or video sequences. Tiled display device 400 includes an image content processor 410, and a central controller 420. Image content processor 410 is substantially similar in organization and operation to image content processor 210 in FIG. 2, but is configured to receive and convert digital image content 102 into image data signals 412, which are configured to provide image data to central controller 420 for tiled display 400. Central controller 420 is substantially similar to controller 220 in FIG. 2, but is further configured to separate image data signals 412 into appropriate output signals 406 and to direct each of output signals 406 to the appropriate electronic display device 450 so that a coherent image or video sequence is displayed by tiled display device 400.

Figure 5:
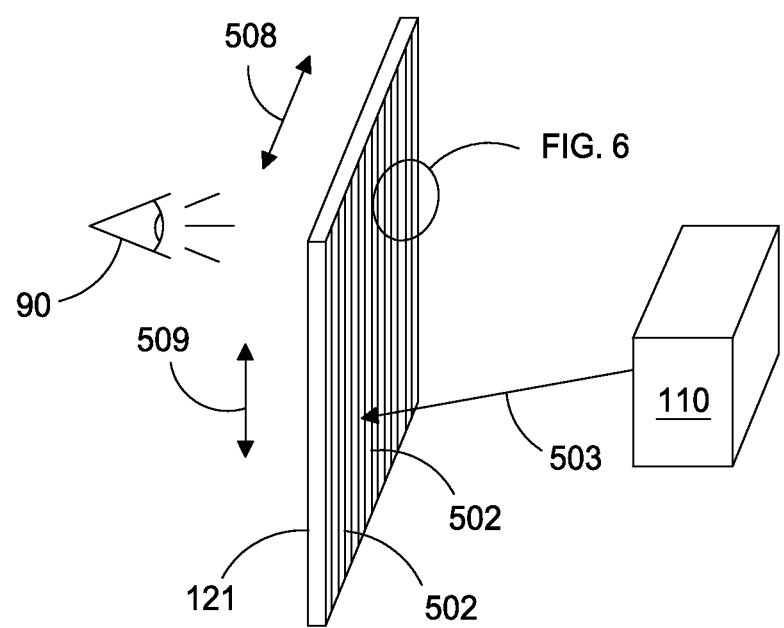
FIG. 5 is a schematic diagram of an imaging system configured with a light module and a display screen, according to one embodiment of the invention.

In some embodiments, imaging system 100 may be configured as an LPD display system. FIG. 5 is a schematic diagram of imaging system 100 configured with a light module 110 and a display screen 121, according to one embodiment of the invention. Display screen 121 includes phosphorescent stripes 502, and light module 110 is configured as a laser module that produces one or more scanning laser beams 503 to excite phosphorescent stripes 502. Phosphorescent stripes 502 are made up of alternating phosphorescent stripes of different colors, e.g., red, green, and blue, where the colors are selected so that they can be combined to form white light and other colors of light. Scanning laser beam 503 is a modulated light beam that is scanned across display screen 121 along two orthogonal directions, e.g., in the horizontal direction 508 and the vertical direction 509, in a raster scanning pattern to produce an image on display screen 121 for a viewer 90. It is noted that phosphor naturally luminesces when excited by the appropriate incident radiation. Thus, when phosphorescent stripes 502 are characterized at the time of manufacture (for example by verifying color and luminance against a calibration standard), an image is known to be correctly produced on display screen 121 when the alignment and operation of the components of light module 110 are monitored and are verified to be correct, even though the luminescence of the phosphor is not monitored directly.

It is noted that laser excitation of light-emitting or fluorescent materials on display screen 121 is but one of various forms of optical excitation technique that can impart energy sufficient to cause the fluorescent materials to emit light or to luminesce. In other embodiments, such optical excitation may be generated by a non-laser light source that is sufficiently energetic to excite the fluorescent materials disposed on display screen 121. Examples of non-laser excitation light sources include various light-emitting diodes (LEDs), light lamps and other light sources that produce light at a wavelength or a spectral band to excite a fluorescent material that converts the light of a higher energy into light of lower energy and in the visible range.

Figure 6:
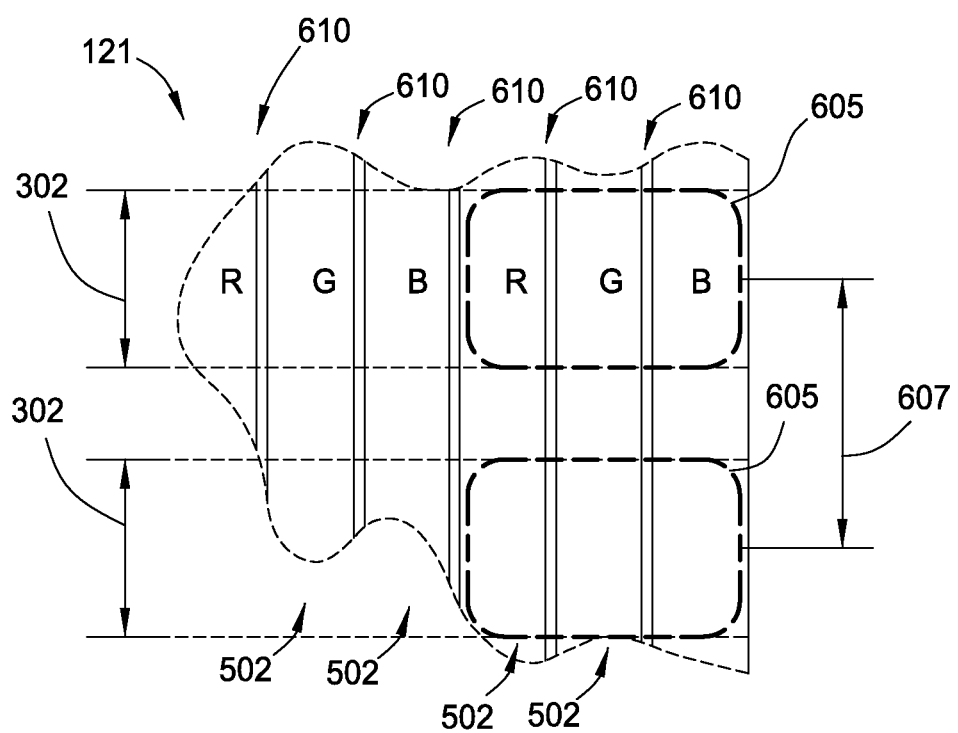
FIG. 6 is a partial schematic diagram of the portion of the display screen indicated in FIG. 5.

FIG. 6 is a partial schematic diagram of the portion of display screen 121 indicated in FIG. 5. FIG. 6 illustrates pixel elements 605, which each include a portion of a red, green, and blue phosphorescent stripe 502. Alternatively, pixel elements 605 include one or more other configurations of phosphorescent regions rather than stripes, such as dots. In some embodiments, each phosphorescent stripe 502 is separated from adjacent phosphorescent stripes by a stripe divider 610. The portion of the phosphorescent stripes 502 that belong to a particular pixel element 605 is defined by the laser scanning paths 302, as shown. Light module 110 forms an image on display screen 121 by directing scanning laser beam 503 along the laser scanning paths 302 and modulating scanning laser beam 503 to deliver a desired amount of optical energy to each of the red, green, and/or blue phosphorescent stripes 502 found within each pixel element 605. Each image pixel element 605 outputs light for forming a desired image by the emission of visible light created by the selective laser excitation of each phosphor-containing stripe in a given pixel element 605. Thus, modulation of the red, green, and blue portions of each pixel element 605 controls the composite color and image intensity at each image pixel element location. In FIG. 6, one dimension of the pixel region is defined by the width of the three phosphorescent stripes 502, and the control of the laser beam spot size defines the orthogonal dimension. In other implementations, both dimensions of image pixel element 605 may be defined by physical boundaries, such as separation of phosphorescent stripes 502 into rectangular phosphor-containing regions or phosphorescent dots.

Figure 7:
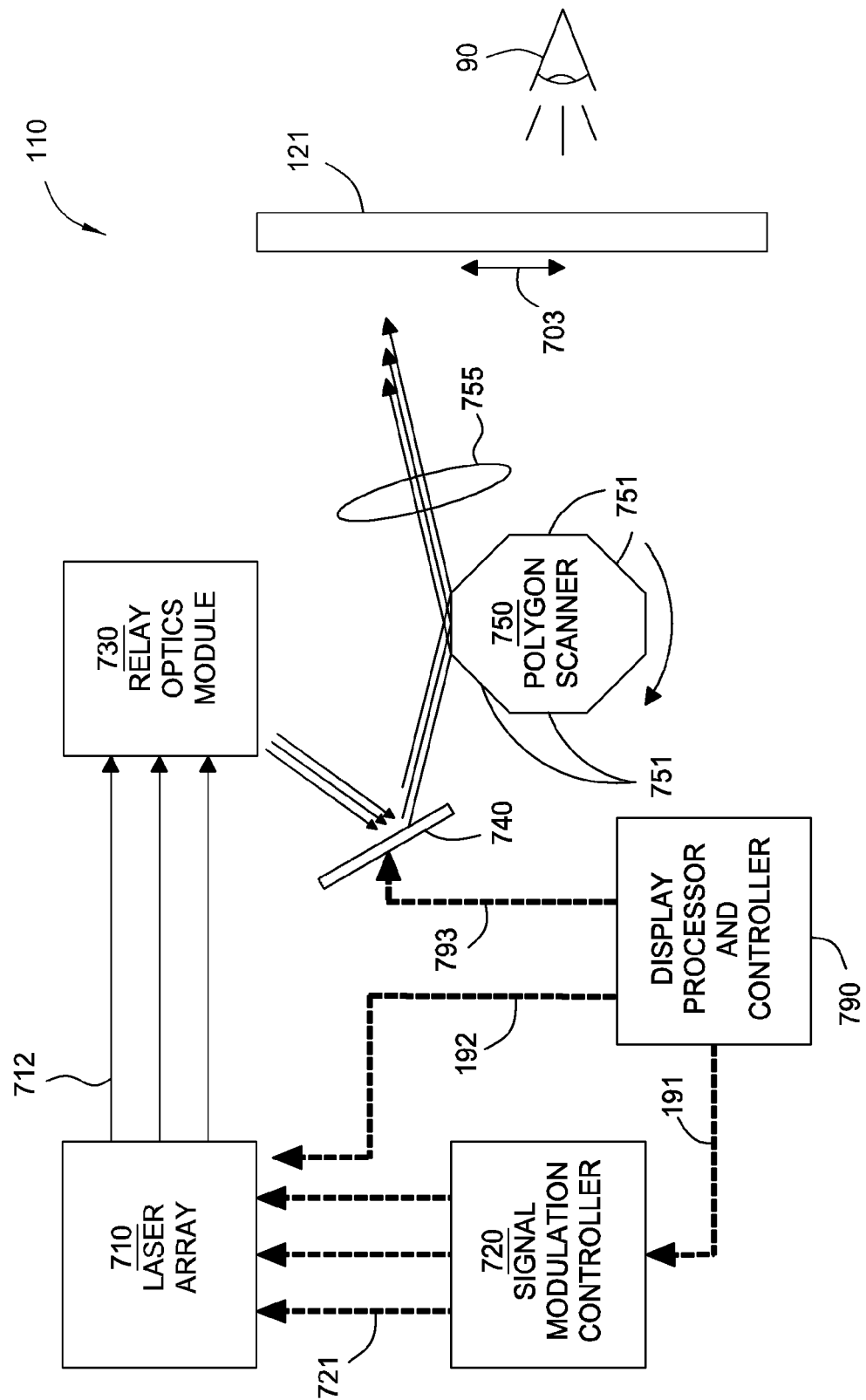
FIG. 7 is a schematic diagram of a light module and a display screen configured according to embodiments of the invention.

FIG. 7 is a schematic diagram of light module 110 and display screen 121 configured according to embodiments of the invention. Light module 110 includes a signal modulation controller 720, a laser array 710, a relay optics module 730, a mirror 740, a polygon scanner 750, an imaging lens 755, and a display processor and controller 790, configured as shown.

Laser array 710 includes multiple lasers, e.g., 5, 10, 20, or more, and generates multiple laser beams 712 to simultaneously scan display screen 121. In one embodiment, the lasers in laser array 710 are ultraviolet (UV) lasers producing light with a wavelength between about 400 nm and 450 nm. Laser beams 712 are modulated light beams that are scanned across display screen 121 along two orthogonal directions, e.g., horizontally and vertically, in a raster scanning pattern to produce an image on display screen 121 for viewer 90.

Signal modulation controller 720 controls and modulates the lasers in laser array 710 so that laser beams 712 are modulated at the appropriate output intensity to produce a desired image on display screen 121. Signal modulation controller 720 may include a digital image processor that generates laser modulation signals 721. Laser modulation signals 721 include the three different color channels and are applied to modulate the lasers in laser array 710.

Together, relay optics module 730, mirror 740, polygon scanner 750, and imaging lens 755 direct laser beams 712 to display screen 121 and scan laser beams 712 horizontally and vertically across display screen 121 in a raster-scanning pattern to produce an image. For the sake of description, "horizontal" with respect to display screen 121 in FIG. 7 is defined as parallel to arrow 703 and "vertical" with respect to fluorescent screen 701 is defined as perpendicular to the plane of the page. Relay optics module 730 is disposed in the optical path of laser beams 712 and is configured to shape laser beams 712 to a desired spot shape and to direct laser beams 712 into a closely spaced bundle of somewhat parallel beams. Mirror 740 is a reflecting optic that can be quickly and precisely rotated to a desired orientation, such as a galvanometer mirror, a microelectromechanical system (MEMS) mirror, etc. Mirror 740 directs laser beams 712 from relay optics module 730 to polygon scanner 750, where the orientation of mirror 740 partly determines the vertical positioning of laser beams 712 on display screen 121. Polygon scanner 750 is a rotating, multi-faceted optical element having a plurality of reflective surfaces 751, e.g., 5 to 10, and directs laser beams 712 through imaging lens 755 to display screen 121. The rotation of polygon scanner 750 sweeps laser beams 712 horizontally across the surface of display screen 121 and further defines the vertical positioning of laser beams 712 on display screen 121. Imaging lens 755 is designed to direct each of laser beams 712 onto the closely spaced pixel elements 205 on display screen 121.

In operation, the positioning of mirror 740 and the rotation of polygon scanner 750 horizontally and vertically scan laser beams 712 across display screen 121 so that all of pixel elements 605 are illuminated as desired. To with, as polygon scanner 750 rotates one of reflective surfaces 751 through incident laser beams 712, each of laser beams 712 is directed to sweep horizontally across display screen 121 from one side to the other, each laser beam following a different vertically displaced laser scanning path 302, thereby illuminating the pixel elements 605 disposed in these laser scanning paths 302 (laser scanning paths 302 and pixel elements 605 are illustrated in FIG. 6). Given N lasers in laser array 710 and N laser beams 712, a "swath" consisting of N laser scanning paths 204 is illuminated as polygon scanner 750 rotates one of reflective surfaces 751 through incident laser beams 712. Because each of reflective surfaces 751 is canted at a different angle with respect to the horizontal, i.e., the plane of the page, when polygon scanner 750 rotates a subsequent reflective surface 751 through incident laser beams 712, the beams sweep horizontally across display screen 121 at a different vertical location. Thus, given N laser beams and M reflective surfaces 751 of polygon scanner 750, one rotation of polygon scanner 750 "paints" M×N rows of pixels. If display screen 121 is made up of more than M×N horizontal rows of pixels, then mirror 740 can be repositioned so that another block of M×N horizontal rows of pixels will be painted during the next rotation of polygon scanner 750. Once all pixels of display screen 121 have been illuminated, mirror 740 returns to an initial or top position and the cycle is repeated in synchronization with the refresh rate of the display.

Because the phosphorescent stripes 502 are spaced at relatively narrow pitch, e.g., on the order of 300 µm-600 µm, precise alignment of light module 110 with respect to display screen 121 during operation of imaging system 100 is highly desirable. Misalignment of the lasers in laser array 710 by as little as 600 µm to 1200 µm or less can cause laser beams 712 to illuminate a different phosphorescent stripe 502 than the intended target phosphorescent stripe while being scanned across display screen 101, thereby resulting in significant image quality problems, including changes in color and brightness.

In order to ensure such highly accurate alignment, in some embodiments imaging system 100 includes servo control mechanisms based on a designated servo beam that is scanned over the screen by the same optical scanning components that scan laser beams 712 across display screen 121. This designated servo beam is used to provide servo feedback control over the scanning excitation beams, i.e., laser beams 712, to ensure proper optical alignment and accurate delivery of optical pulses during operation of imaging system 100. In some embodiments, the servo beam is at a different wavelength of light than laser beams 712, e.g., the servo beam may be an infra-red (IR) beam, and display screen 121 is configured to reflect the servo beam to produce servo feedback light. In other embodiments, laser beams 712 can be used to produce servo feedback light in addition to or in lieu of a dedicated IR servo beam. In such embodiments, an image can be generated on display screen 121 that is centered vertically and horizontally without adjustments or other intervention on the part of a user. Furthermore, such servo feedback light can be used to provide optical feedback signal 242 in FIG. 2.

Thus, in the embodiment described above in conjunction with FIG. 7, a confirmation signal received when an image is rendered on display screen 121 may include signals indicating one or more of the following: the multiple lasers of laser array 710 are all operational and have correctly calibrated output intensity; mirror 740 cycles correctly between various desired operating positions; polygon scanner 750 rotates at the desired rotational velocity and is synched correctly with the pulsing of the lasers of laser array 710; the portion of display screen 121 that is considered non-operational due to detected screen break, and the like. It is understood that when one or more of the above components of the confirmation signal indicate faulty operation, the confirmation signal may further include a signal indicating that desired digital image content is not being rendered in a visible manner on display screen 121.

Figure 8:
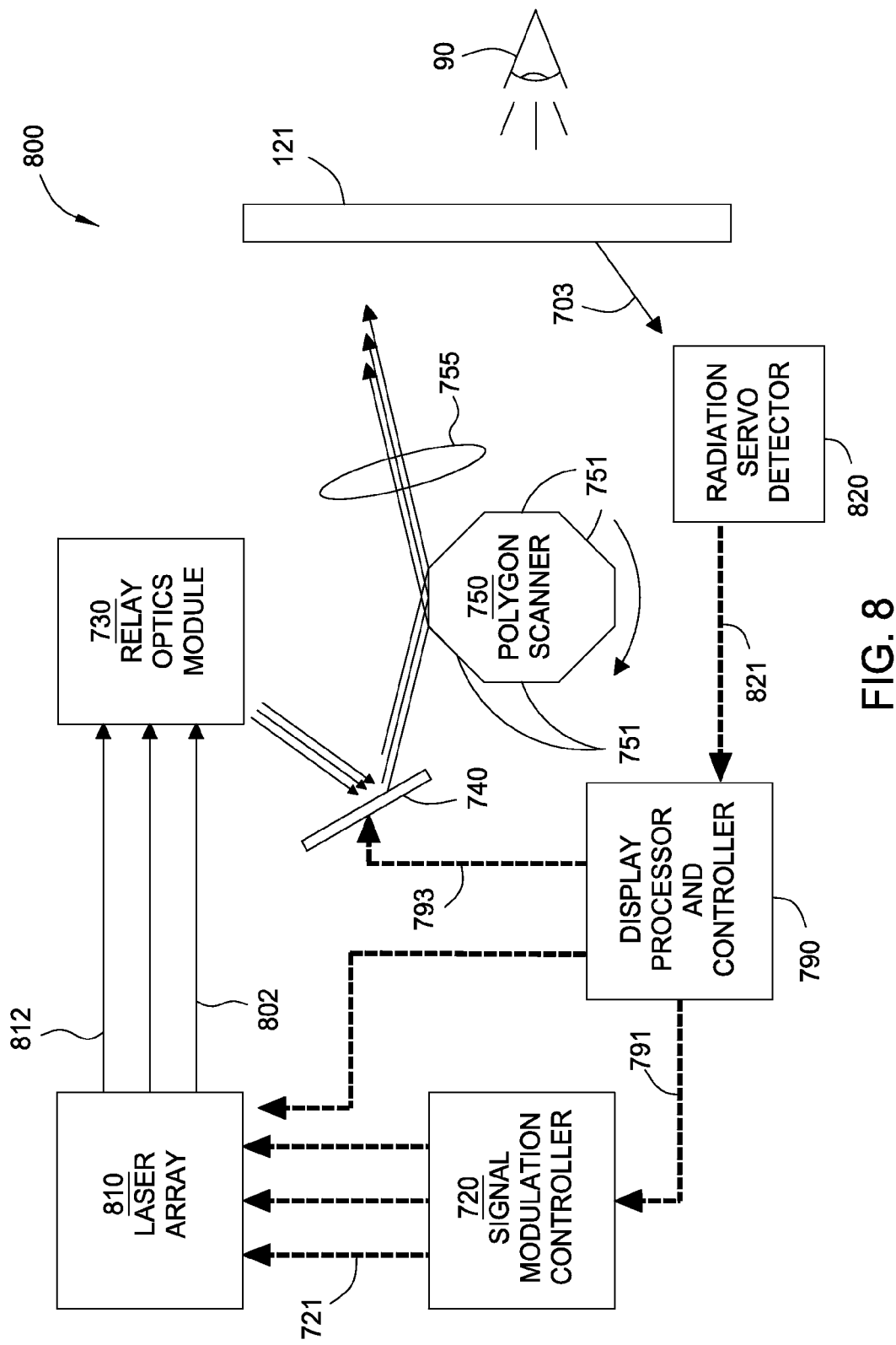
FIG. 8 is a schematic diagram of a light module configured with a servo beam, according to embodiments of the invention.

FIG. 8 is a schematic diagram of a light module 800 configured with a servo beam, according to embodiments of the invention. Light module 800 is a laser module substantially similar to laser module 110 in organization and operation, with the following exceptions. Laser array 810 includes, in addition to laser array 710 described above in conjunction with FIG. 7, a laser diode for generating a servo beam 802. Laser beams 812 include laser beams 112 for exciting phosphors and servo beam 802 to provide servo feedback control over laser beams 112. Display screen 121 includes reflective servo reference marks disposed on display screen 121, and these reflective servo reference marks reflect servo beam 802 away from display screen 121 as servo feedback light 832. Light module 800 also includes one or more radiation servo detectors 820, which detect servo feedback light 832 and direct servo detection signals 821 to display processor and controller 790 for processing. The servo reference marks may be located between phosphorescent stripes 502 in the active display area of display screen 121, in an off-screen calibration module, or both. In some embodiments, one servo lock system is utilized in imaging system 100 to maintain proper alignment of laser beams 812 vertically and a different servo lock system is utilized to maintain proper alignment of laser beams 812 horizontally.

Figure 9:
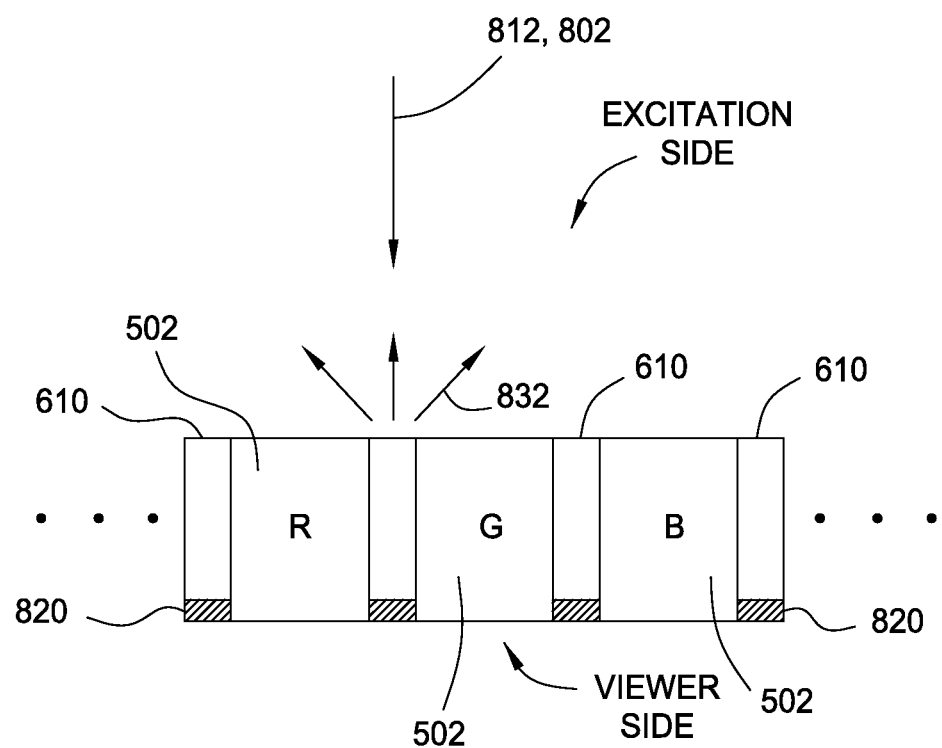
FIG. 9 schematically illustrates a display screen configured to provide a servo feedback light, where the servo feedback light can include reflected light from a servo beam and/or reflected light from laser beams.

In some embodiments, servo feedback light 832 is used to align laser beams 812 horizontally with respect to display screen 121, i.e., laser beams 812 are each aligned with the proper phosphorescent stripe 502. FIG. 9 schematically illustrates display screen 121 configured to provide servo feedback light 832, where servo feedback light 832 can include reflected light from servo beam 802 and/or reflected light from laser beams 812. Display screen 121 includes stripe dividers 610 that are disposed between phosphorescent stripes 502 and made optically reflective to the servo and excitation beams so that the reflection can be used as feedback light 832. The stripe divider 610 can also be made reflective and opaque to incident light to optically isolate adjacent phosphorescent stripes 502 to enhance contrast and to reduce cross talk there between. Phosphorescent stripes 502 are less reflective to servo beam 802 and laser beams 812 than stripe dividers 610 so that servo feedback light 832 exhibits a spike in intensity each time servo beam 802 and/or laser beams 812 are scanned across a stripe divider 610. An absorbent black layer 820 may be coated on each stripe divider 610 on the viewer side of display screen 121 to reduce glare of ambient light to viewer.

Figure 10:
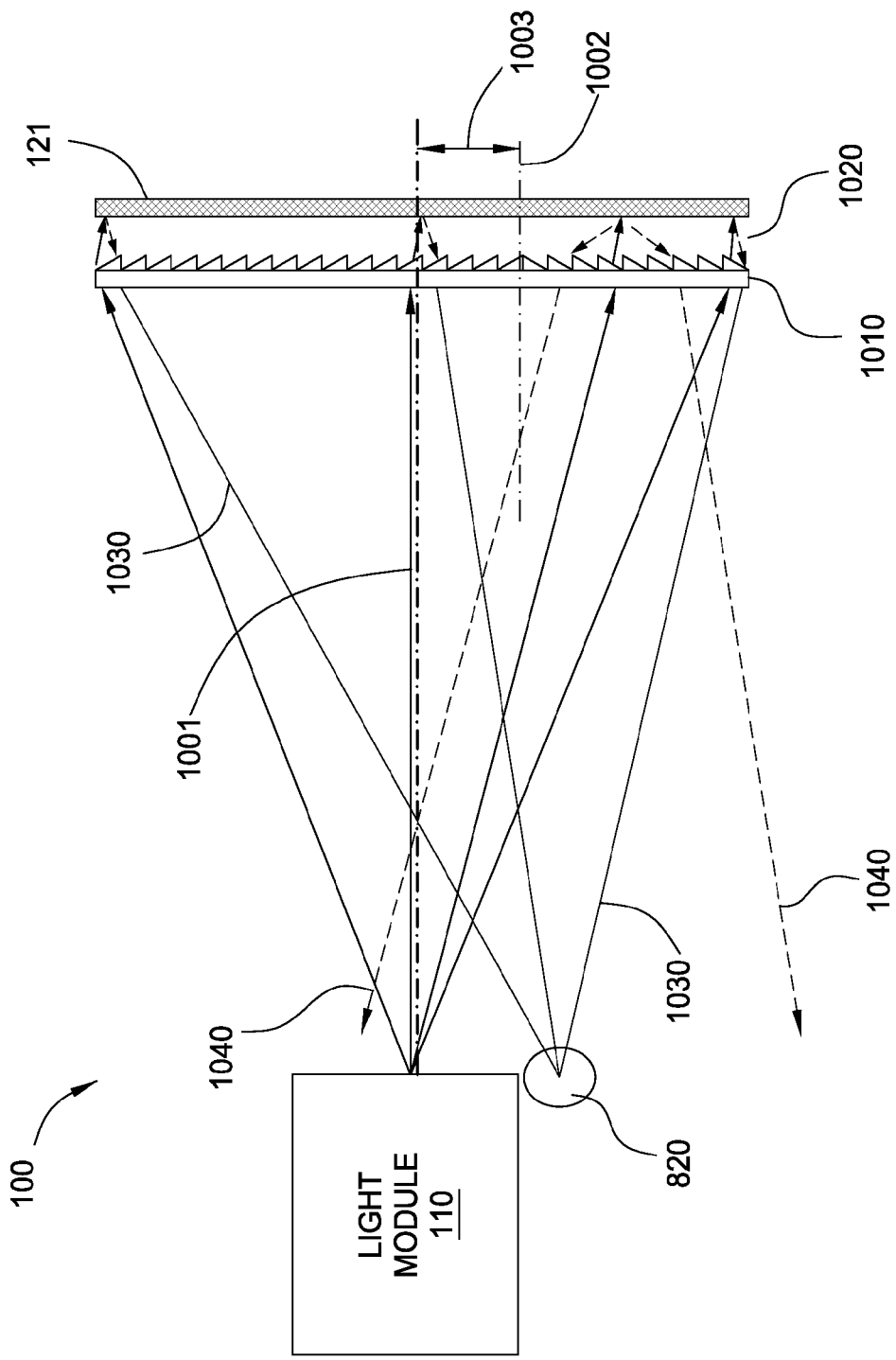
FIG. 10 schematically illustrates a configuration of a display screen that facilitates the detection of a servo feedback light based on the specularly reflective surfaces of stripe dividers and the optically diffusive surfaces of phosphorescent stripes, according to an embodiment of the invention.

In each horizontal scan of servo beam 802 and laser beams 812 across phosphorescent stripes 502 the reflections produced by stripe dividers 610 can be used to indicate horizontal positions of the stripe dividers 610, spacing between two adjacent stripe dividers 610, and horizontal positions servo beam 802 and laser beams 812 with respect to display screen 121. Therefore, reflections from stripe dividers 610 can be used for servo control of the horizontal alignment between laser beams 812 and phosphorescent stripes 502. In some embodiments, stripe dividers 610 have a specularly reflective surface and phosphorescent stripes 502 have an optically diffusive surface, in order to enhance the detectability of servo feedback light 832. In such embodiments, stripe dividers 610 have a smooth surface on the excitation side of display screen 121 to produce a specular reflection of incident IR, such as incident servo beam 802. In contrast, phosphorescent stripes 502 have a roughened surface that diffuses reflected IR light, and therefore produces diffused reflections that spread in different directions to form a diffused reflection cone. Such a diffused reflection cone is illustrated in FIG. 10. It is noted that the two specularly reflective and optically diffusive surfaces on the excitation side of display screen 121 have approximately the same optical transmission for light at the wavelength of laser beams 812.

FIG. 10 schematically illustrates a configuration of display screen 121 that facilitates the detection of servo feedback light 832 based on the specularly reflective surfaces of stripe dividers 610 and the optically diffusive surfaces of phosphorescent stripes 502, according to an embodiment of the invention. Laser module 110 projects and scans both servo beam 802 and laser beams 812 onto display screen 121 with stripe dividers 610 acting as specularly reflective IR feedback marks. Laser module 110 has a symmetric optic axis 1001 around which the beam scanning is performed, and a fresnel lens layer 1010 and an air gap 1020 are disposed adjacent display screen 121, as shown. Fresnel lens layer 1010 is an optical telecentric lens that may be configured as a layer incorporated within the structure of display screen 121. Fresnel lens layer 1010 is configured to couple servo beam 802 and laser beams 812 onto display screen 121 with substantially normal incidence to display screen 121. Fresnel lens layer 1010 is configured with its symmetric optic axis 1002 oriented parallel to symmetric optic axis 1001 of laser module 110 and with an offset 1003 therebetween as shown.

Fresnel lens layer 1010 is optically positioned between laser module 110 and the phosphorescent stripes of display screen 121 to direct servo feedback light 832 to radiation servo detector 820. Specifically, symmetric optic axis 1002 of fresnel lens layer 1010 is oriented parallel to and offset from symmetric optic axis 1001 of laser module 110. In this way, light from servo beam 802 is specularly reflected when incident on stripe dividers 610 and is directed by fresnel lens layer 1010 to radiation servo detector 820, while light from servo beam 802 is diffusely reflected when incident on phosphorescent stripes 502 and is spread by fresnel lens layer 1010 over relatively large area so that only a very small fraction of the diffusely reflected light from servo beam 802 is received by radiation servo detector 820. Consequently, servo detection signals 821 from radiation servo detector 820 can be used to determine a hit by servo beam 802 on a stripe divider 610 configured as a servo reference mark.

In some embodiments, the light of laser beams 812 can also be reflected back by the specular and diffusive regions on display screen 121. Hence, the specularly reflected light at the excitation wavelength is also directed back to radiation servo detector 820. A wavelength selective optical beam splitter can be used to split the collected light at the servo wavelength and the collected light at the excitation wavelength into two separate signals for separate optical detectors, where radiation servo detector 820 receives the IR servo light and another servo detector receives the feedback light at the excitation wavelength.

In some embodiments, servo feedback light 832 is used to align laser beams 812 vertically with respect to display screen 121 and with respect to each other. In some embodiments, peripheral servo reference marks are positioned outside the active display area of display screen 121, such as in an off-screen calibration module, and are used to produce feedback light 832 in FIG. 8. In such embodiments, the servo reference marks may include scribe lines that, when traversed by servo beam 802 and/or laser beams 812, produce servo feedback light 832 that allows image display device 120 of imaging system 100 to determine the vertical position of servo beam 802 and/or laser beams 812. Such peripheral servo reference marks can also be used to facilitate the generation of optical feedback signal 242 in FIG. 2.

Figure 11:
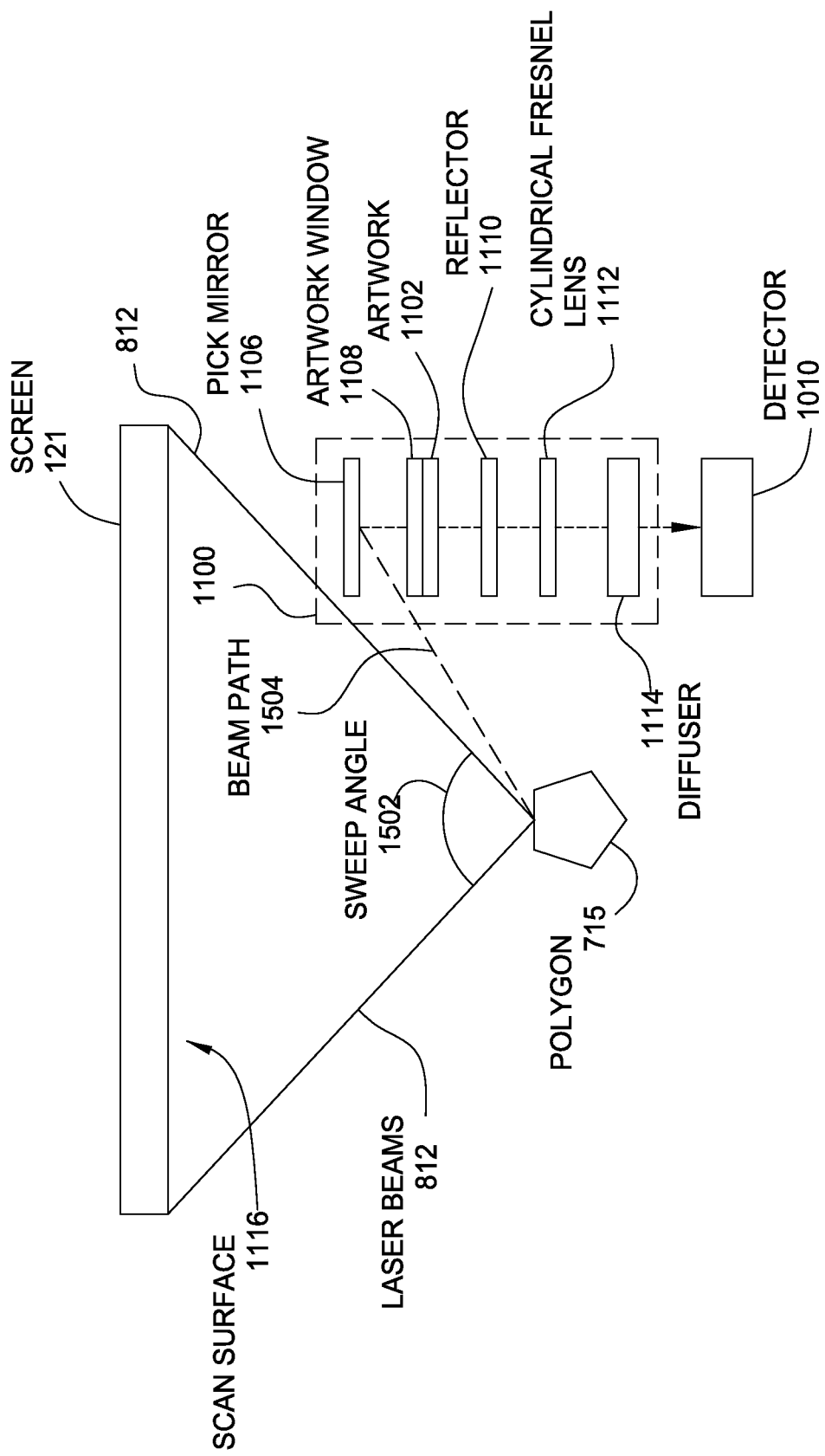
FIG. 11 schematically illustrates a display screen configured with an off-screen calibration module to determine the vertical position of a servo beam and/or laser beams, according to an embodiment of the invention.

FIG. 11 schematically illustrates display screen 121 configured with an off-screen calibration module 1100 to determine the vertical position of servo beam 802 and/or laser beams 812, according to an embodiment of the invention. Off-screen calibration module 1100 is disposed outside of the active display area of display screen 121 and includes artwork 1102 and optical components for directing servo feedback light 832 to a detector 1010. The term "artwork" is used herein to describe a surface having lines and marks drawn thereon to enable calibration. Artwork 1102 may include a pair of vertical scribe lines and a set of scribes that are transmissive to servo beam 802 and/or laser beams 812. The optical components of off-screen calibration module 1100 include a pick mirror 1106, an artwork window 1108, a reflector 1110, a cylindrical fresnel lens 1112, and a diffuser 1114. Pick mirror 1106 reflects incident light beams through artwork window 1108 to artwork 1102. Reflector 1110 reflects the transmitted portion of incident laser beams to cylindrical fresnel lens 1112, which directs the reflected laser beams to diffuser 1114. Detector 1010 then detects the diffuse laser beams. Scribes included in artwork 1102 have geometries that transmit different amounts of incident light depending on the vertical position at which the incident light traverses the scribes. For example, the scribes included in artwork 1102 may be diamond-shaped, triangular, etc. Thus, the servo feedback light 832 detected by detector 1010 varies in brightness depending on the vertical position of the incident light beam being measured, and image display device 120 of imaging system 100 can determine the vertical position of a desired light beam. Mirror 740 can the be adjusted accordingly to precisely position laser beams 812 as desired with respect to display screen 121. In addition, servo beam 802 and/or laser beams 812 can be directed to a reflective region of off-screen calibration module 1100 that is free of artwork 1102, and pulsed to generate a signal. Such a signal can be translated into a numerical value for inclusion in signature output 243 in FIG. 2.

In sum, embodiments of the invention set forth systems and methods for closed-loop verification that specific content has been displayed by an electronic display device. When desired digital image content is rendered as an image or video by the electronic display device, a confirmation signal may be generated by one or more components of the display device to verify that the content has been successfully displayed. The confirmation signal may include performance measurements of the one or more components of the display device, thereby indicating whether or not said components are operating within a desired specification while the digital image content is rendered as an image or video. In some embodiments, the confirmation signal may further include a signature output that is associated with a signature code embedded in the digital image content. Because the signature output can uniquely identify specific digital image content that has been displayed by the electronic display device, the display device can advantageously verify that the specific content has been successfully displayed.

While the foregoing is directed to embodiments of the present invention, other and further embodiments of the invention may be devised without departing from the basic scope thereof, and the scope thereof is determined by the claims that follow.

I claim:

1. An imaging system comprising:
an image processing unit configured to receive a digital image having a signature code embedded therein and convert an image data signal derived from the digital image into pixel-based data capable of being displayed;
an image display device configured to generate the digital image on a display surface based on the pixel-based data; and
a verification unit configured to determine, for each parameter included in a plurality of parameters associated with the image data signal, whether a value for the parameter matches an expected value range for the parameter, wherein one parameter included in the plurality of parameters comprises a signature output that is associated with the signature code and uniquely identifies the digital image,
wherein the image display device comprises: a light source configured to illuminate at least a portion of the image on the display surface; and an optical assembly configured to direct light from the light source to the display surface.

2. The imaging system of claim 1, wherein the verification unit performs the determining concurrently with the image display device generating the digital image on the display surface.

3. The imaging system of claim 1, wherein at least one of the plurality of parameters corresponds to a portion of the display surface that is not viewable by a viewer.

4. The imaging system of claim 1, wherein one parameter included in the plurality of parameters comprises a light source brightness signal, and the verification unit compares a pulse width of a light source to an expected value and compares a pulse amplitude of the light source to an expected value.

5. The imaging system of claim 4, wherein the one parameter included in the plurality of parameters is measured on a side of the display surface that faces the light source.

6. The imaging system of claim 1, wherein one parameter included in the plurality of parameters comprises at least one of a performance measurement associated with a component of the imaging system and the signature code embedded in the digital image generates the signature output when digital image is rendered as an image or video on the display surface.

7. The imaging system of claim 6, wherein the performance measurement comprises at least one of a screen break value received from a screen break detector, a light source brightness signal, and an optical feedback signal generated from a non-viewable side of the display surface that is not viewable by a viewer.

8. The imaging system of claim 7, wherein the image display device comprises a light source and the optical feedback signal is generated by one of illuminating calibration features disposed on the non-viewable side of the display surface with light from the light source and illuminating calibration features disposed on the non-viewable side of the display surface with a servo beam.

9. The imaging system of claim 7, wherein the optical feedback signal includes an alignment value that quantifies alignment of the portion of the display surface illuminated by the light source with a desired portion of the display surface.

10. The imaging system of claim 1, wherein the signature output associated with the signature code is generated when the digital image containing the signature code is rendered as a visible image or video on the display surface.

11. The imaging system of claim 10, wherein the signature output corresponds to a portion of the display surface that is not viewable by a viewer.

12. The imaging system of claim 11, wherein the signature output is included in an optical feedback signal generated from a non-viewable side of the display surface that is non-viewable by a viewer.

13. The imaging system of claim 12, wherein the optical feedback signal is generated by at least one of scanning a light source across calibration features disposed on the non-viewable side of the display surface and scanning a servo beam across calibration features disposed on the non-viewable side of the display surface.

14. The imaging system of claim 10, wherein the signature output comprises a numerical value derived from one or more attributes of the digital image.

15. The imaging system of claim 10, wherein the signature output is configured with a timestamp so that a period of time can be determined during which the digital image is displayed on the display surface.

16. The imaging system of claim 1, wherein the verification unit is located remotely from the image display device.

17. A method for confirming that a digital image is being properly displayed, the method comprising:
   generating an image data signal based on the digital image having a signature code embedded therein;
   converting the image data signal into pixel-based data in order to display the digital image on a display surface; and
   for each parameter included in a plurality of parameters associated with the image data signal, determining whether a value for the parameter matches an expected value for the parameter, wherein one parameter included in the plurality of parameters comprises a signature output that is associated with the signature code and uniquely identifies the digital image, and wherein the pixel-based data comprises data configured to control a light source and an optical assembly based on the pixel-based data to display the digital image.

18. The method of claim 17, wherein determining whether a value for the parameter matches an expected value range for the parameter is performed in association with displaying the digital image.

19. The method of claim 17, wherein one or more of the plurality of parameters associated with the image data signal comprises at least one of a performance measurement associated with a component of the imaging system and the signature code embedded in the digital image generates the signature output when digital image is rendered as an image or video on the display surface.

20. An imaging system comprising:
   a light source configured to generate at least one energy beam for illuminating a portion of a display surface;
   an optical assembly configured to direct the at least one light beam to the display surface;
   an image processing unit configured to receive a digital image having a signature code embedded therein and convert an image data signal derived from the digital image into pixel-based data capable of being displayed; and
   a controller configured to generate the digital image on the display surface by controlling the light source and the optical assembly based on the pixel-based data and to determine, for each parameter included in a plurality of parameters associated with the image data signal, whether a value for the parameter matches an expected value range for the parameter, wherein one parameter included in the plurality of parameters comprises a signature output associated with the signature code, and the signature output is generated when the digital image is rendered as an image or video on the display surface.

21. The imaging system of claim 20, wherein the signature output associated with the signature code is generated when the digital image containing the signature code is rendered as a visible image or video on the display surface.

* * * * *